United States Patent
Ellen et al.

(10) Patent No.: US 9,897,158 B2
(45) Date of Patent: Feb. 20, 2018

(54) ADAPTER FOR AN ISOLATION MOUNT DESIGN

(71) Applicant: Caterpillar Inc., Peoria, IL (US)

(72) Inventors: Brett D. Ellen, Peoriea Heights, IL (US); Daniel Joshua Smith, Pekin, IL (US); Wen Zhong, West Lafayette, IN (US); Hong Lian, Peoria, IL (US); Matt Schwarzendruber, Peoria, IL (US); Ross Paul Wietharn, Peoria, IL (US); James D. Neirynck, Neponset, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 15/197,305

(22) Filed: Jun. 29, 2016

(65) Prior Publication Data

US 2018/0003254 A1 Jan. 4, 2018

(51) Int. Cl.
| *F16F 7/00* | (2006.01) |
| *F16F 1/36* | (2006.01) |
| *F16M 13/02* | (2006.01) |
| *B62D 33/06* | (2006.01) |
| *E02F 9/16* | (2006.01) |

(52) U.S. Cl.
CPC ............ *F16F 1/36* (2013.01); *B62D 33/0604* (2013.01); *E02F 9/166* (2013.01); *F16M 13/02* (2013.01)

(58) Field of Classification Search
CPC .... F16F 7/00; F16F 15/00; F16F 15/04; F16F 2228/00; F16F 2228/066; F16F 2236/04
USPC ....... 248/560, 637, 638; 267/140.11, 140.13, 267/292, 294
See application file for complete search history.

(56) References Cited

U.S. PATENT DOCUMENTS

| 3,675,881 | A | | 7/1972 | Caldwell |
| 4,012,071 | A | | 3/1977 | Jones et al. |
| 4,014,588 | A | | 3/1977 | Kohriyama |
| 4,135,757 | A | | 1/1979 | Smith et al. |
| 4,783,039 | A | * | 11/1988 | Peterson ............... F16F 3/0873 248/634 |
| 5,641,153 | A | | 6/1997 | Gwinn |
| 5,845,895 | A | | 12/1998 | Nakada et al. |

(Continued)

FOREIGN PATENT DOCUMENTS

GB    2480158 A    11/2011

OTHER PUBLICATIONS

GMT Rubber-Metal-Technic GBMH, Elastic Mountings for Construction Equipment, sales brochure, http://www.gmt-gmbh.de/upload/Kataloge/Baumaschinenindustrie.pdf, published on the internet in 2010 in Germany.

(Continued)

*Primary Examiner* — Steven Marsh
(74) *Attorney, Agent, or Firm* — Bart A. Fisher

(57) ABSTRACT

An isolation mount assembly comprises a resilient member defining a central aperture that defines a load axis and an annular depression about the load axis, and an adapter plate including an outer mechanical attachment structure that defines a first thickness and an inner attachment structure that is closer to the load axis than the outer attachment structure along a direction that is perpendicular to the load axis and that defines a second thickness. The inner attachment structure is disposed in the annular depression and the second thickness is at least twice the first thickness.

18 Claims, 8 Drawing Sheets

(56) References Cited

U.S. PATENT DOCUMENTS

| | | | |
|---|---|---|---|
| 6,450,473 B1 | 9/2002 | Kondo et al. | |
| 7,389,977 B1 * | 6/2008 | Fernandez | F16F 3/087 |
| | | | 267/141.2 |
| 7,416,174 B2 * | 8/2008 | Dickson | F16F 15/08 |
| | | | 267/141.1 |
| 7,416,244 B2 | 8/2008 | Polk et al. | |
| 7,918,438 B2 * | 4/2011 | Sato | F16F 1/38 |
| | | | 248/634 |
| 7,950,729 B2 | 5/2011 | Gerke | |
| 8,360,405 B2 * | 1/2013 | Stillabower | F16F 3/0876 |
| | | | 267/141.4 |
| 8,443,923 B2 | 5/2013 | Brosz et al. | |
| 8,939,437 B2 * | 1/2015 | Kobori | F16F 1/3735 |
| | | | 267/140.3 |
| 9,193,396 B2 | 11/2015 | Davisdon et al. | |
| 2006/0202101 A1 * | 9/2006 | Dickson | F16F 1/3735 |
| | | | 248/638 |
| 2009/0289472 A1 | 11/2009 | Catanzarite et al. | |
| 2011/0135434 A1 | 6/2011 | Yoon | |
| 2012/0049038 A1 | 3/2012 | Bachmeyer et al. | |

OTHER PUBLICATIONS

GMT Rubber-Metal-Technic LTD, "Machine Feet", catalog, thttp://www.gmt-rubber.com/PDFs/Machine-Feet.pdf, published on the internet in Jan. 2016 in the UK.

* cited by examiner

ADAPTER FOR AN ISOLATION MOUNT DESIGN

TECHNICAL FIELD

The present disclosure relates generally to methods for making machines and groups of machines and assembling machines. More specifically, the present disclosure relates to devices and methods for isolating one part of a machine from another to limit the conveyance of vibrations and the like.

BACKGROUND

Many machines that use isolation mounts are provided with mounting interfaces that allow only a certain type of isolation mount to be used with the components of that machine. Two common types of isolation mounts that are currently being used include rubber isolation mounts, so called as the rubber provides the desired dampening of vibrations, and fluid, viscous, or hydro type mounts, so called as the fluid provides viscous dissipation that dampens the vibrations. Typically, both of these type of isolation mounts use different mounting configurations, forcing the designer to choose a particular design early in the design phase of a machine. The isolation mounts also support, attach and position one structural member to another and may control and reduce vibration.

As can be imagined, prototyping is necessary while designing, building and testing various versions and proposed designs. Vibration testing of a cab that may be mounted to a frame of a machine is usually done to make sure that the isolation mounts are suitable for the application. As a result of testing or in order to reduce cost, the type of isolation mount may be changed during the design process. This may result in delayed machine build time and increased product development time that is undesirable as the mounting configurations of the machine must be changed to adapt to that of the desired style of isolation mount.

Similarly, during the life of a machine, it may be desirable to switch from one style of isolation mount to another for various reasons such as design improvements, cost reduction, repair, overhaul, etc. However, such a change is difficult to make given the different mounting configurations for various styles of isolation mounts currently available on the market.

FIG. 1 illustrates an application of a prior art rubber isolation mount assembly used on a machine 100, which is a bulldozer for an example. The machine 100 includes a motor 106 that powers a track driven undercarriage 108, and an articulated linkage assembly 110 that moves a work implement such as a bucket 112. The machine 100 includes a cab assembly 102 with a first structural member 114 that is mounted to the frame assembly 104 of the machine 100 via a plurality of isolation mount assemblies 116. This rubber isolation mount is not compatible with fluid isolation mounting structures.

SUMMARY OF THE DISCLOSURE

An isolation mount assembly is provided comprising a resilient member defining a central aperture that defines a load axis, the resilient member further defining an annular depression about the load axis, and an adapter plate including an outer mechanical attachment structure that defines a first thickness measured along the load axis and an inner attachment structure that is closer to the load axis than the outer attachment structure along a direction that is perpendicular to the load axis and that defines a second thickness measured along the load axis. The inner attachment structure is disposed in the annular depression and the second thickness of the inner attachment structure is at least twice the thickness of the outer mechanical attachment structure.

An isolation mount assembly is provided comprising a resilient member defining a central aperture that defines a load axis, the resilient member including a first end and a second end that are spaced from each other along the load axis, an adapter plate including inner attachment structure and outer mechanical attachment structure that is further away from the load axis than the inner attachment structure; and a flanged sleeve including a flange that is configured to contact a first end of the resilient member and a shaft that defines a central bore that defines a longitudinal axis. The longitudinal axis of the sleeve is coincident with the load axis of the resilient member when the shaft of the flanged sleeved is disposed in the central aperture of the resilient member and the central bore of the shaft of the flanged sleeve includes internal threads.

A machine is provided comprising a first structural member, a second structural member, and an isolation mount assembly attached to the first and second structural members and disposed therebetween. The isolation mount assembly comprises a resilient member defining a central aperture that defines a load axis, the resilient member including a first end and a second end that are diametrically opposite each other along the load axis, an adapter plate including inner attachment structure and outer attachment structure that is further away from the load axis than the inner attachment structure, and a flanged sleeve including a flange that is configured to contact a first end of the resilient member and a shaft that defines a central bore that defines a longitudinal axis. The longitudinal axis of the sleeve is coincident with the load axis of the resilient member when the shaft of the flanged sleeved is disposed in the central aperture of the resilient member and the central bore of the shaft of the flanged sleeve includes internal threads.

DETAILED DESCRIPTION

Figure 1:
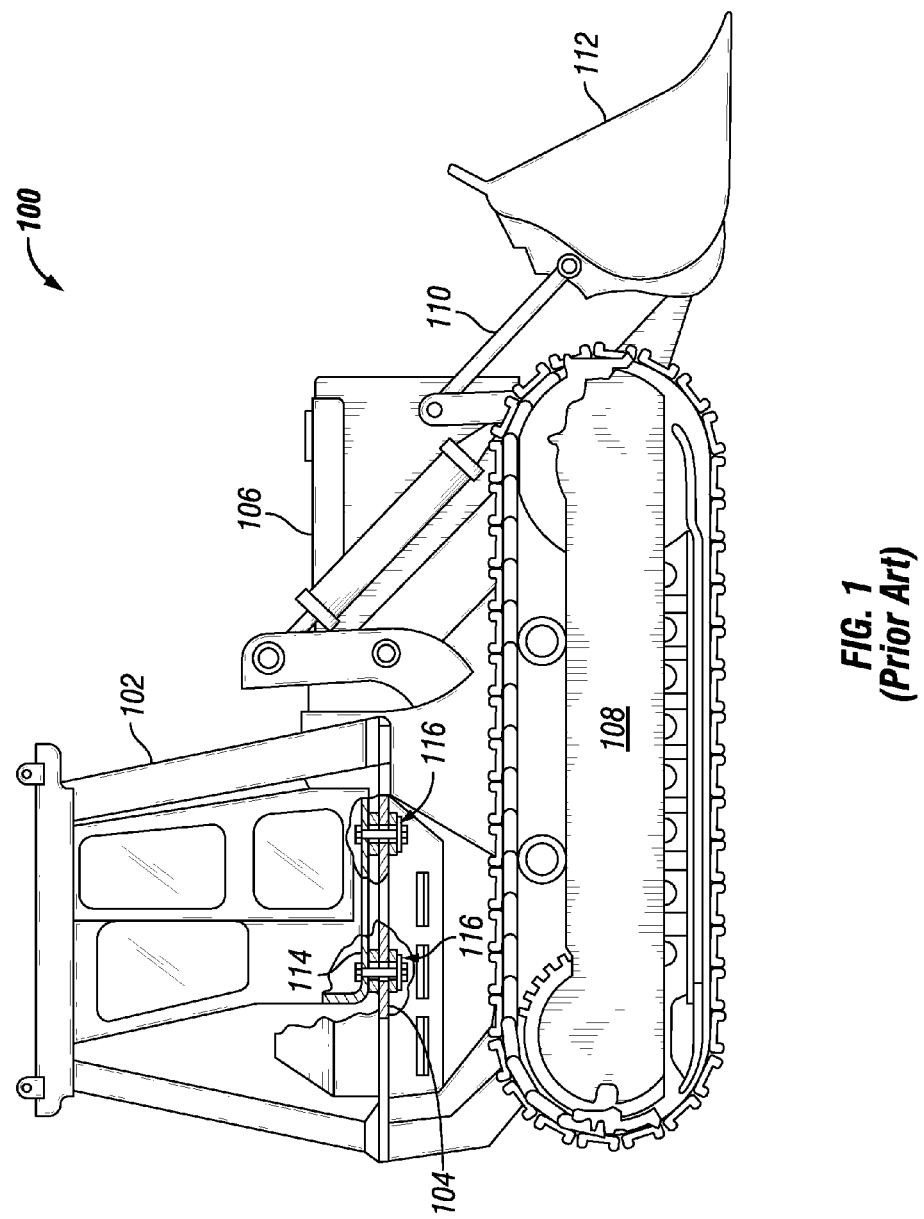
FIG. 1 is a side view of a machine that includes a frame, a cab, and an isolation mount assembly according to an embodiment of the prior art.

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100a, 100b or a prime indicator such as 100', 100" etc. It is to be understood that the use of letters or primes immediately after a reference number indicates that these features are similarly shaped and have similar function as is often the case when geometry is mirrored about a plane of symmetry. For ease of explanation in this specification, letters or primes will often not be included herein but may be shown in the drawings to indicate duplications of features discussed within this written specification.

An isolation mount design that incorporates an adapter plate assembly that is compatible with a mounting configuration associated with fluid isolation mounts may be provided according to various embodiments of the present disclosure. Structure that provides for a robust bonding of a rubber or other resilient member to the adapter plate may also be provided as well as a flange sleeve that allows the resilient member to be pre-compressed before the mount assembly is attached to a machine.

Figure 2:
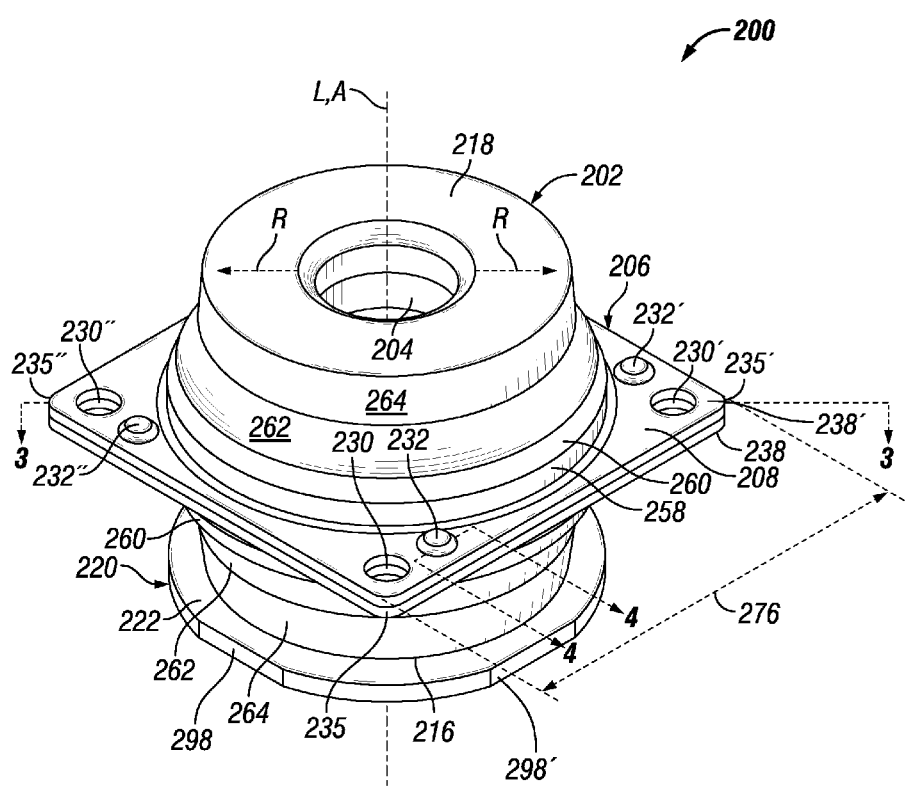
FIG. 2 is a perspective view of an isolation mount assembly of FIG. 1, typically used with lighter weight applications with a resilient member that is shown in an uncompressed state.
Figure 3:
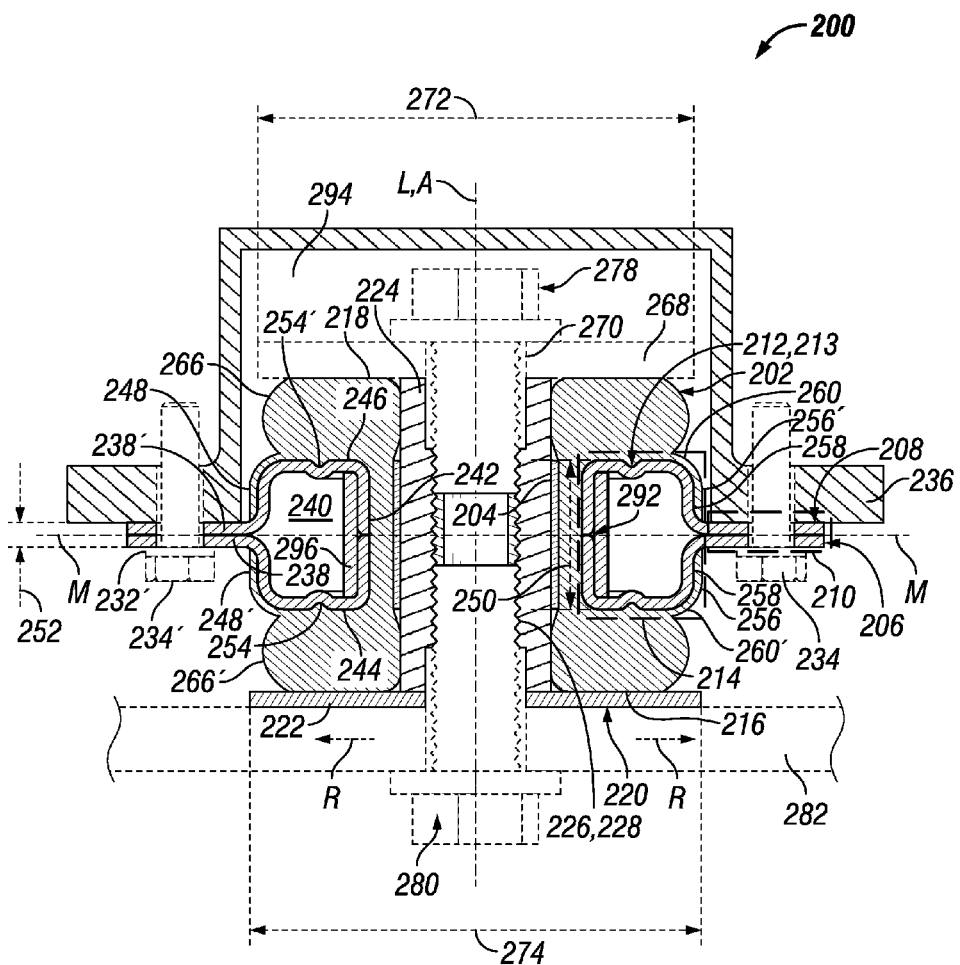
FIG. 3 is sectional view of the isolation mount assembly of FIG. 2 taken along lines 3-3 thereof, showing that the adapter plate is hollow and the resilient member in a compressed state.

Looking at FIGS. 2 and 3, an isolation mount assembly 200 that is compatible with the mounting structure associated with fluid isolation mount assemblies is provided that is intended for use with lighter weight or smaller platforms. The isolation mount assembly 200 comprises a resilient member 202 defining a central aperture 204 that defines a load axis L, and an adapter plate 206 including an outer mechanical attachment structure 208 that defines a first surface area 210 and an inner attachment structure 212 that defines a second surface area 214 that is closer to the load axis L than the outer attachment structure along a direction that is perpendicular to the load axis L (for example radial direction R). As best seen in FIG. 3, the second surface area 214 of the inner attachment structure 212 is greater than the first surface area 210 of the mechanical attachment structure 208, providing a robust bonding of the resilient member 202 to the adapter plate 206, allowing it to withstand large forces exerted on the assembly over time.

Also, the resilient member 202 includes a first end 216 and a second end 218 that are diametrically opposite each other along the load axis L and a flanged sleeve 220 is provided that includes a flange 222 that is configured to contact the first end 216 of the resilient member 202. As best seen in FIG. 3, the flanged sleeve 220 further comprises a shaft 224 that defines a central bore 226 that defines a longitudinal axis A. The longitudinal axis A of the sleeve 220 is coincident with the load axis L of the resilient member 202 when the shaft 224 of the flanged sleeve 220 is disposed in the central aperture 204 of the resilient member 202 and the central bore 226 of the shaft 224 of the flanged sleeve 220 includes internal threads 228.

Focusing on FIG. 2, the adapter plate 206 includes a substantially square configuration with a clearance hole 230 and a rivet structure 232 disposed adjacent each other in each corner 235 of the adapter plate 206 (the fourth corner and associated features are hidden by the resilient member 202 but it is to be understood that it is similarly configured as the other three corners). More specifically, the clearance hole/rivet structure 230, 232 repeats in a circular array in a counterclockwise direction about the load axis L. A plurality of clearance holes 230 are provided on the outer mechanical attachment structure 208, so called as it is further away from the load axis L than the inner attachment structure 212 (see also FIG. 3) along the radial direction R. This allows for a plurality of fasteners 234 to bolt or otherwise attach the adapter plate 206 and the isolation mount assembly 200 to a first structural member 236 in a manner known in the art for mounting fluid isolation mount assemblies. In some embodiments, only one such clearance hole 230 may be necessary. Similarly, a plurality of rivet structures 232 are provided but only one such structure may necessary in other embodiments that is configured to hold the formed sheets 238 together.

Alternatively, the configuration of the adapter plate 206 may be described as having an inner attachment structure 212 that is closer to the load axis L than the outer mechanical attachment structure 208 in the radial direction R. For this embodiment as best seen in FIG. 3, the adapter plate 206 is an assembly that includes at least two formed sheets 238 that are attached to each other. Consequently, the inner attachment structure 212 is at least partially hollow 240. The inner attachment structure 212 is enlarged in the cross-section of FIG. 3 as compared to the outer mechanical attachment structure 208 and defines an inner bonding surface 242, a lower bonding surface 244, an upper bonding surface 246, and an outer bonding surface 248, wherein a recess 250 is disposed on at least one of the upper and lower bonding surfaces 246, 244.

The increase in the surface area from the outer mechanical attachment structure 208 to the inner attachment structure 212 may be at least attributable to the fact that the upper bonding surface 246 is spaced away from the lower bonding surface 244 by a distance or thickness 250 that is at least greater than four times the nominal wall thickness of the formed sheets 238. Put another way, this thickness 250, which may be referred to as the thickness of the inner attachment structure 212 measured along the load axis L, may be at least two times the total thickness 252 of the outer mechanical attachment structure 208 measured in like fashion. In this embodiment, this distance 250 is at least greater than ten times the nominal wall thickness of the formed sheets or five to six times the thickness 252 of the outer mechanical attachment structure 208.

Since the resilient member envelops the adapter plate, it defines an annular depression 213 about the load axis L that is complimentary shaped to the inner attachment structure 212 and that receives the inner attachment structure 212. In other words, the inner attachment structure 212 is disposed in this annular depression 213 about the load axis L.

Furthermore, the inner attachment structure 212 defines at least one recess 254 that is configured to create an undercut in a direction that is perpendicular to the load axis L. For this embodiment, at least one such recess 254 is placed on the upper and lower bonding surfaces 246, 244 but is contemplated only one such recess or no such recesses may be necessary in other embodiments. Also, the inner attachment structure 212 is shown in FIG. 3 to be completely enveloped by the resilient member 202. Thus, a thin layer 256 of rubber or other material that forms the resilient member 202 extends down around the periphery of the inner attachment structure 212, forming the inner bonding surface 248. This may not be true for other embodiments such as that shown and described with reference to FIGS. 5 and 6 later herein.

With continued reference to FIGS. 2 and 3, it can be seen that the resilient member 202 is substantially axis-symmetrical about the load axis L as is the inner attachment structure 212 of the adapter plate 206. The resilient member 202 includes a cylindrical exterior surface 258 that extends along the load axis L from the midplane M of the isolation mount assembly 200 that is defined by the planar interface between the formed sheets 238 of the adapter plate assembly 206 (see FIG. 3). Focusing on FIG. 2, this cylindrical exterior surface 258 than transitions into a convex blend 260 that then transitions into a concave blend 262 that then transitions to a conical surface 264. Once compressed as shown in FIG. 3, the concave blend 262 and conical surface 264 are distorted, forming a single bulging surface 266. It should be noted that the resilient member 202 and the isolation mount assembly 200 are also substantially symmetrical about the midplane M. It is contemplated that no planes of symmetry may be provided for other embodiments.

As depicted by FIGS. 2 and 3, the isolation mount assembly 200 may further comprise a compression plate 268 that defines a mounting aperture 270 wherein the compression plate 268 is configured to contact the second end 218 of the resilient member 202 opposite the flanged sleeve 220 along the load axis L and the mounting aperture 270 is configured to align with the central bore 226 of the shaft 222 of the flanged sleeve 220. The compression plate 268 may define a maximum dimension 272 that is perpendicular to the load axis L, the flange 222 of the flanged sleeve 220 may defines a maximum dimension 274 of the flanged sleeve that is perpendicular to the load axis L, and the adapter plate may define a minimum dimension 276 that is perpendicular to the load axis L, wherein the maximum dimension 272, 274 of the compression plate or the flange sleeve is less than or equal to the minimum dimension 276 of the adapter plate.

The isolation mount assembly 200 may also include a first mounting fastener 278 that is operatively associated with the compression plate 268, wherein the first mounting fastener 278 includes external threads that are configured to mate with the internal threads 228 of the bore 226 of the shaft 224 of the flanged sleeve 220. Tightening this mounting fastener 278 creates the pre-compression of the resilient member 202 before the isolation mount assembly 200 is attached to a machine, which is useful as will be explained later herein. A second mounting fastener 280 is also provided that mates with the internal threads 228 of the bore 226 of the shaft 224 of the flanged sleeve 220 and that is operatively associated with a second structural member 282 for attaching the isolation mount assembly 200 to the second structural member 282. This made possible by the bonding that is present between the shaft 224 of the flanged sleeve 220 and the inside surface of its central aperture 204. As shown in FIG. 3, a cylindrically shaped support tube 296 may be disposed in the hollow portion of the inner attachment structure of the support plate. In some cases, the tube 296 may be positioned proximate the radial extremities 292 of the formed sheets 138. In certain embodiments, support tube may help connect the formed sheets 138 together and support the metal when the isolation mount is loaded.

Figure 4:
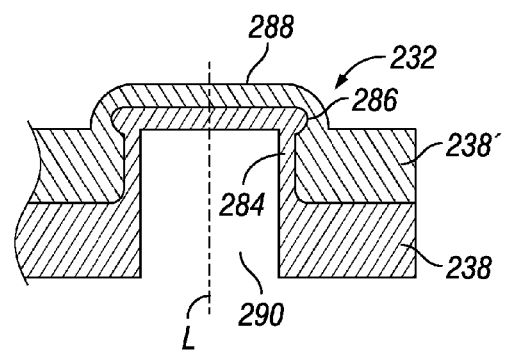
FIG. 4 is a detail sectional view of the isolation mount assembly of FIG. 2 taken along lines 4-4 thereof, showing a deformed metal crimp, creating a rivet like structure holding the adapter plate assembly together.

FIG. 4 illustrates in cross-section how the rivet structure 232 is created. A pressing operation extrudes a boss 284 of material from the lower sheet 238 into the upper sheet 238', forming an undercut 286 along the load axis L that keeps the sheets together. A button protrusion 288 is formed by this process on the upper sheet 238' while a depression 290 is formed on the lower sheet 238. Alternatively, a separate rivet member may be used that pierces through the sheets. Although not clearly shown in FIG. 3, the radial inner extremities 292 of the formed sheets 138 that form the inside bonding surfaces 242 may have features that provide a slight interference fit between them adjacent the midplane M, helping to hold the sheets together. It is contemplated that other methods and devices may be used to attach the sheets together such as adhesives, welding, fastening, metal crimping, etc.

The resilient member of any embodiment discussed herein may be made from rubber, polyurethane or any other suitable material that may provide the desired characteristics such as vibration dampening and load capacity over time, etc.

Figure 5:
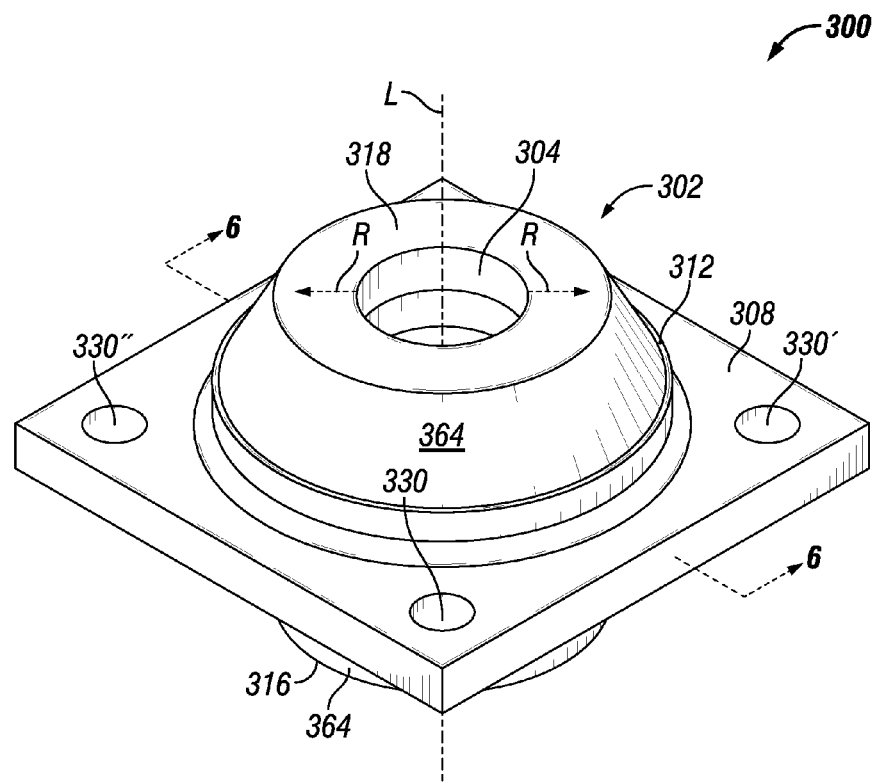
FIG. 5 is a perspective view of an alternate embodiment of an isolation mount assembly of the present, typically used with heavier weight applications.
Figure 6:
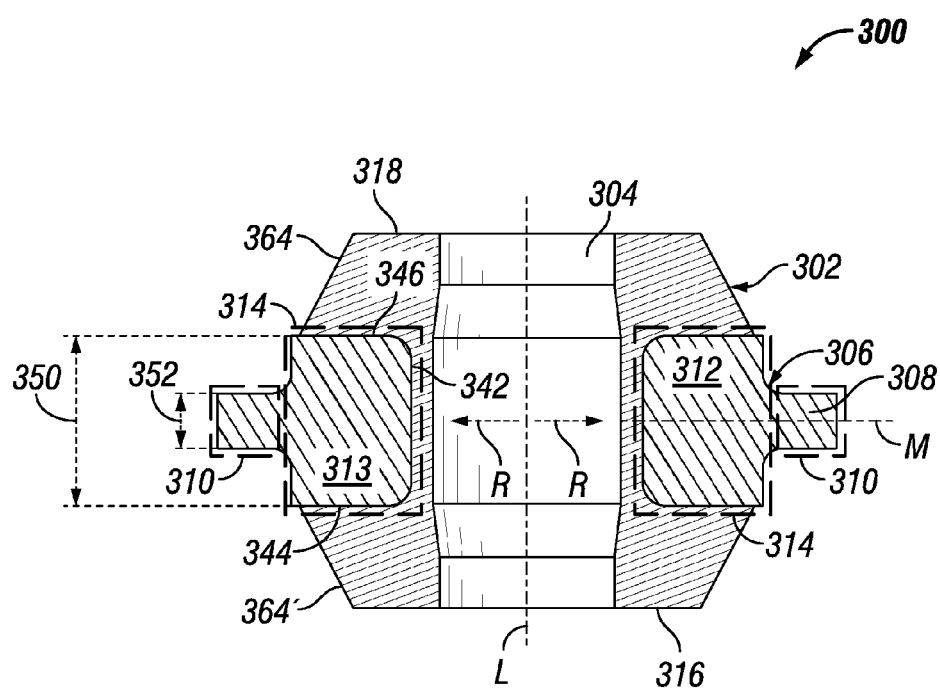
FIG. 6 is sectional view of the of the isolation mount assembly of FIG. 5 taken along lines 6-6 thereof, showing that the adapter plate is solid.

FIGS. 5 and 6 illustrate another embodiment of an isolation mount assembly 300 that is compatible with the mounting structure associated with fluid isolation mount assemblies that is intended for use with heavier weight or larger platforms. The isolation mount assembly 300 comprises a resilient member 302 defining a central aperture 304 that defines a load axis L, and an adapter plate 306 including an outer mechanical attachment structure 308 that defines a first surface area 310 and an inner attachment structure 312 that defines a second surface area 314 that is closer to the load axis L than the outer attachment structure along a direction that is perpendicular to the load axis L (for example radial direction R). As best seen in FIG. 6, the second surface area 314 of the inner attachment structure 312 is greater than the first surface area 310 of the mechanical attachment structure 308, providing a robust bonding of the resilient member 302 to the adapter plate 306, allowing it to withstand large forces exerted on the assembly over time.

Also, the resilient member 302 includes a first end 316 and a second end 318 that are diametrically opposite each other along the load axis L. While no flanged sleeve or compression plate are shown with respect to this embodiment, it is to be understood that they may in fact be used with this embodiment in a similar fashion as described with respect to the embodiment of FIGS. 2 and 3 provided that they are adjusted in configuration to match the size of this assembly 300.

The inner attachment structure 312 is enlarged in the cross-section of FIG. 6 as compared to the outer mechanical attachment structure 308 and defines a lower bonding surface 344, an upper bonding surface 346, and an inner bonding surface 342. Unlike the previous embodiment, no recess is provided that creates an undercut in the radial direction R and no outer bonding surface is created as the resilient member does not envelop the inner attachment structure of the adapter plate completely. Also, the adapter plate is made from a single or unitary piece of material. The increase in the surface area from the outer mechanical attachment structure 308 to the inner attachment structure 312 may be at least attributable to the fact that the upper bonding surface 346 is spaced away from the lower bonding surface 344 by a thickness 350 that is greater than the thickness 352 of the outer mechanical attachment structure 308 measured in direction of the load axis L. In this embodiment, this thickness 350 is at least greater than two to three times the thickness 352 of the outer mechanical attachment structure 308.

Since the resilient member partially envelops the adapter plate, it defines an annular depression 313 about the load axis L that is complimentary shaped to the inner attachment structure 312 and that receives the inner attachment structure 312. In other words, the inner attachment structure 312 is disposed in this annular depression 313 about the load axis L.

For any of the embodiments discussed herein, the increase of surface area from the outer mechanical attachment structure to the inner attachment structure may be achieved by other methods than an increase in thickness along the load axis L. For example, undulations or other features may be provided to increase the surface area and/or undercuts may be provided that help retain the resilient member onto the adapter plate.

With continued reference to FIGS. 5 and 6, it can be seen that the resilient member 302 is substantially axis-symmetrical about the load axis L as is the inner attachment structure 312 of the adapter plate 306. It includes a conical surface 364 that extends from the upper bonding surface of the inner attachment structure away from the midplane M along the load axis L. It should be noted that the resilient member 302 and the isolation mount assembly 300 are also substantially symmetrical about the midplane M. It is contemplated that no planes of symmetry may be provided for other embodiments.

Looking at FIG. 5, no rivet structures are needed since the adapter plate is a single piece of material. A plurality of clearance holes 330 are provided for attaching to a structural member in like fashion as described for the previous embodiment in FIG. 2.

INDUSTRIAL APPLICABILITY

In practice, an isolation mount assembly may be sold or otherwise be provided that includes an adapter plate and/or a flanged sleeve according to any of the embodiments discussed herein. In some cases, a compression plate and fasteners may also be provided. Also, a new machine may be sold or otherwise be provided using any embodiment of an isolation mount assembly as described herein.

Figure 7:
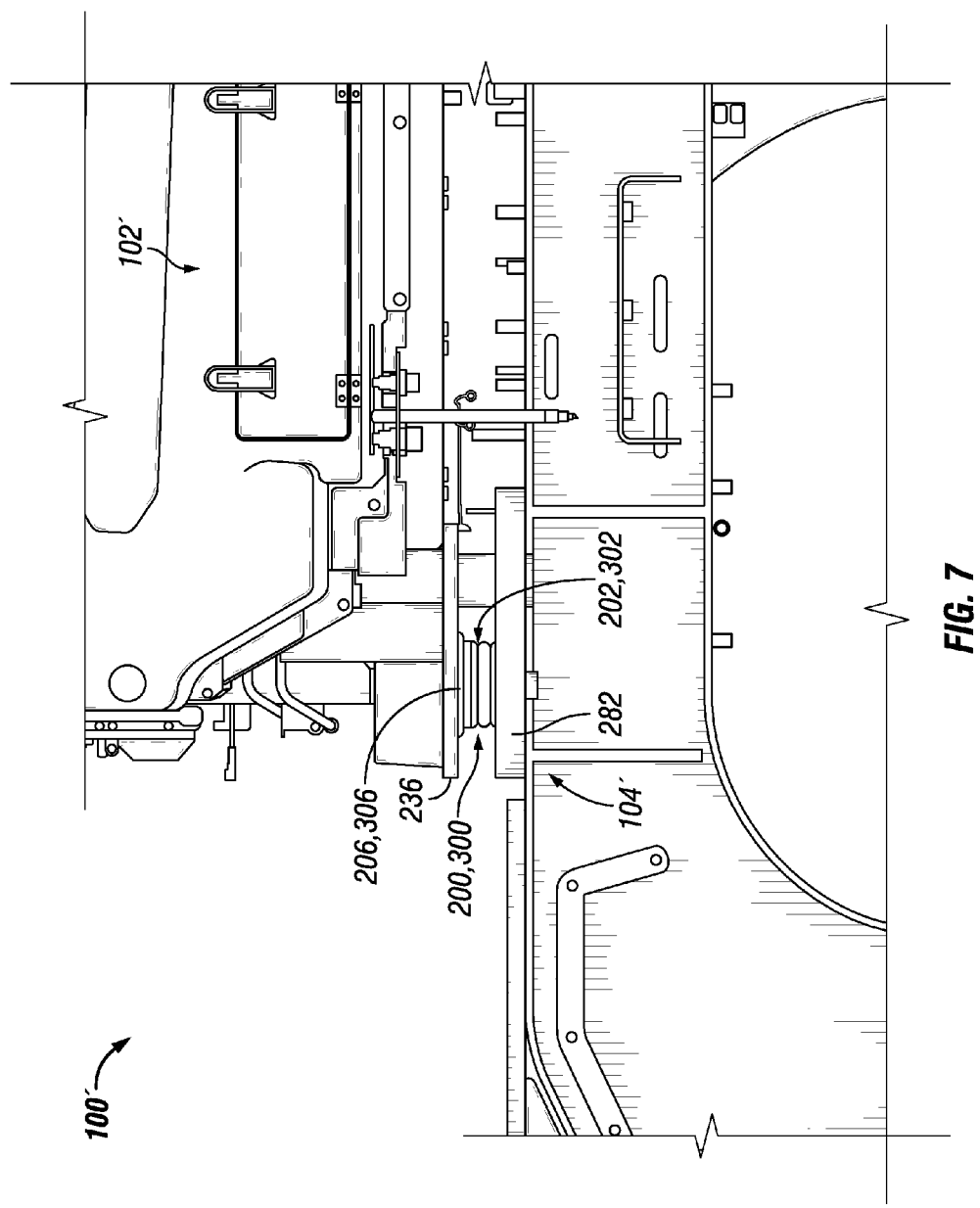
FIG. 7 is a side view of a cab assembly and a frame assembly of a machine that may use the isolation mount assembly shown and described with reference to FIGS. 2 thru 4.
Figure 8:
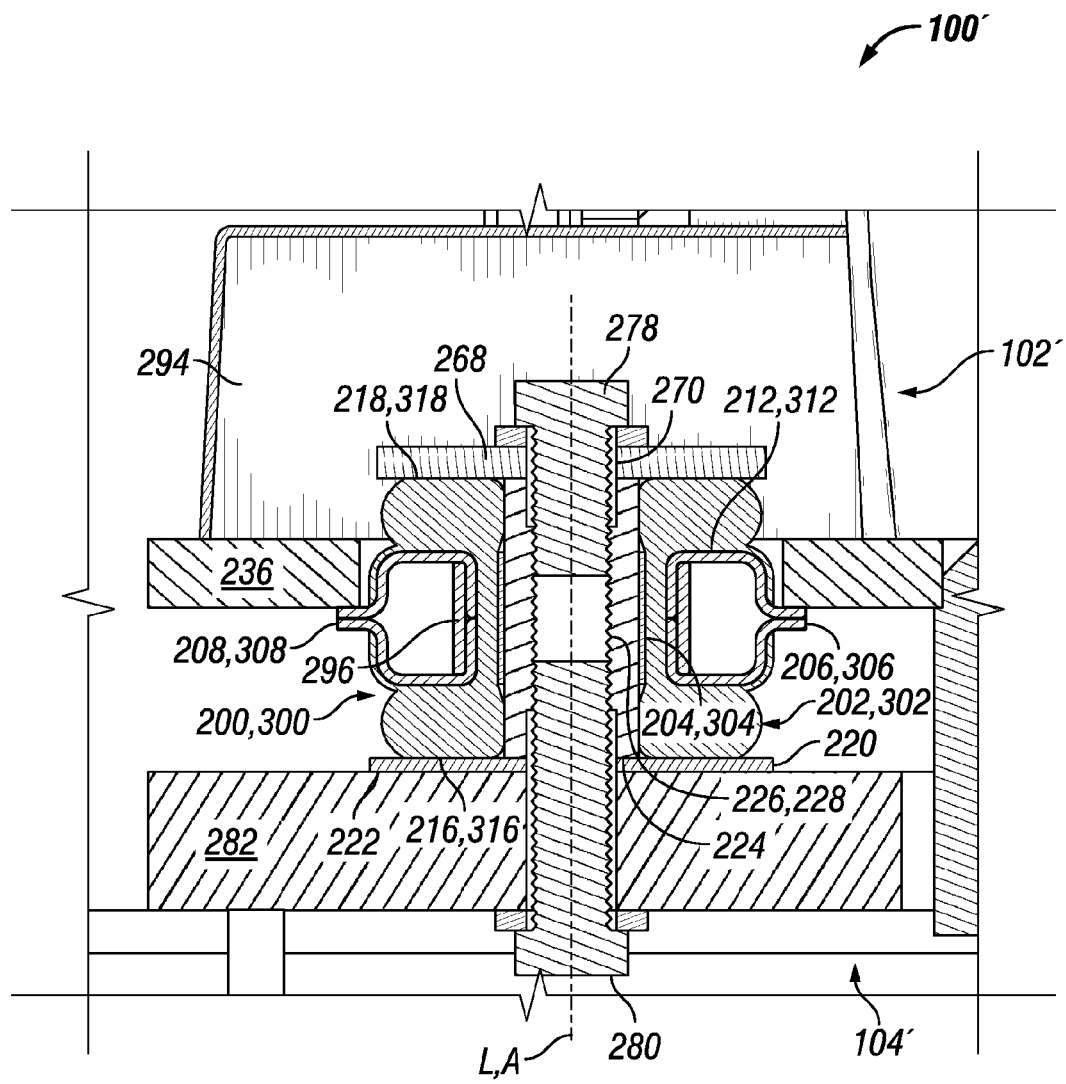
FIG. 8 is an enlarged sectional view of the machine of FIG. 7 showing more clearly how the isolation mount assembly is attached the to the frame assembly and the cab assembly.

Turning to FIGS. 7 and 8, a machine 100' may be provided that has many of the features shown in FIG. 1 but that uses a "platform" mounting structure to mount a cab assembly to the frame assembly using an isolation mount assembly. The machine comprises a first structural member 236, a second structural member 282, and an isolation mount assembly 200, 300 attached to the first and second structural members 236, 282 and disposed therebetween. The isolation mount assembly 200, 300 may comprise a resilient member 202, 302 defining a central aperture 204, 304 that defines a load axis L, the resilient member including a first end 216, 316 and a second end 218, 318 that are diametrically opposite and spaced from each other along the load axis L, an adapter plate 206, 306 including inner attachment structure 212, 312 and outer mechanical attachment structure 208, 308 that is further away from the load axis L than the inner attachment structure, and a flanged sleeve 220 including a flange 222 that is configured to contact a first end 216, 316 of the resilient member 202, 302 and a shaft 224 that defines a central bore 226 that defines a longitudinal axis A. The longitudinal axis A of the sleeve 220 may be coincident with the load axis L of the resilient member 202, 302 when the shaft 224 of the flanged sleeved 220 is disposed in the central aperture 204, 304 of the resilient member 202, 302 and the central bore 226 of the shaft 224 of the flanged sleeve 220 includes internal threads 228.

The machine 100' may further comprise a cab assembly 102' that includes the first structural member 236 and a frame assembly 104' that includes the second structural member 282. It is contemplated that the isolation mount assembly 200, 300 may be rotated 180 degrees, such that the outer mechanical attachment structure 208, 308 is attached to the frame assembly 104' and the flanged sleeve 220 is attached to the cab assembly 102', etc.

Focusing on FIG. 8, the compression plate 268 may define a mounting aperture 270 wherein the compression plate 268 is configured to contact the second end 218, 318 of the resilient member 202, 302 opposite the flanged sleeve 220 along the load axis L and the mounting aperture 270 is configured to align with the central bore 226 of the shaft 224 of the flanged sleeve 220, and wherein the first or second structural members 236, 282 define a blind pocket 294 in which the compression plate 268 is disposed. Since there is no access to any fastener once the isolation mount assembly 200, 300 is inserted into this blind pocket 294, the pre-compression of the assembly 200, 300 using a fastener 278 and the flanged sleeve 222 before inserting the assembly into the pocket is very useful.

In general terms, any of the fasteners 234, 278, 280 mentioned herein may be described as being operatively associated or connected to the assembly 200, 300. For example, a fastener 278 may be operatively associated with the compression plate 268 and another fastener 234, 280 (as best seen in FIG. 3) may operatively associated with the first or second structural members 236, 282. That is to say, the head of a fastener may contact a structural member, a plate or a part of the isolation mount assembly while another portion of the fastener may mate (e.g. via mating threads) with another component for creating an attachment between the components.

A subassembly comprising only the resilient member and the adapter plate may be sold separately from any other components. This subassembly may be manufactured using the following methods.

A rubber or other suitable material may be bonded to the adapter plate. The adapter plate might be a solid forging, or it might be "hollow" stampings from sheet metal that are assembled together. When stampings are used, the inner attachment structure may act as an inner bonding structure. In such a case, the inner bonding structure is cleaned and sprayed with rubber adhesive. The adapter plate would then be loaded into a rubber mold and a vulcanization bonding process performed to bond rubber to the flange (e.g. via injection molding). Then, in some embodiments, the two rubber halves (about the midplane M) would be connected together (not shown in the figures) to form a mount assembly using a center sleeve. An interference fit, or adhesive may be used to attach the various components together. The outer mechanical attachment structure for the stampings would then be connected via deformed metal (rivet structure, toggle-lock, or darts, or crimps), or via adhesive bonding the two sheets together. It is contemplated that in some embodiments the sheets need not be adhered to each other, relying on the final assembly where the bolted joints going through the sheets to attach the isolation mount assembly to the cab or frame, locking the two halves together in service.

The flanged sleeve is shown as being an assembly of separate flange and shaft components that are welded together, however, it is contemplated that the flanged sleeve may be integrally formed as one piece.

Figure 9:
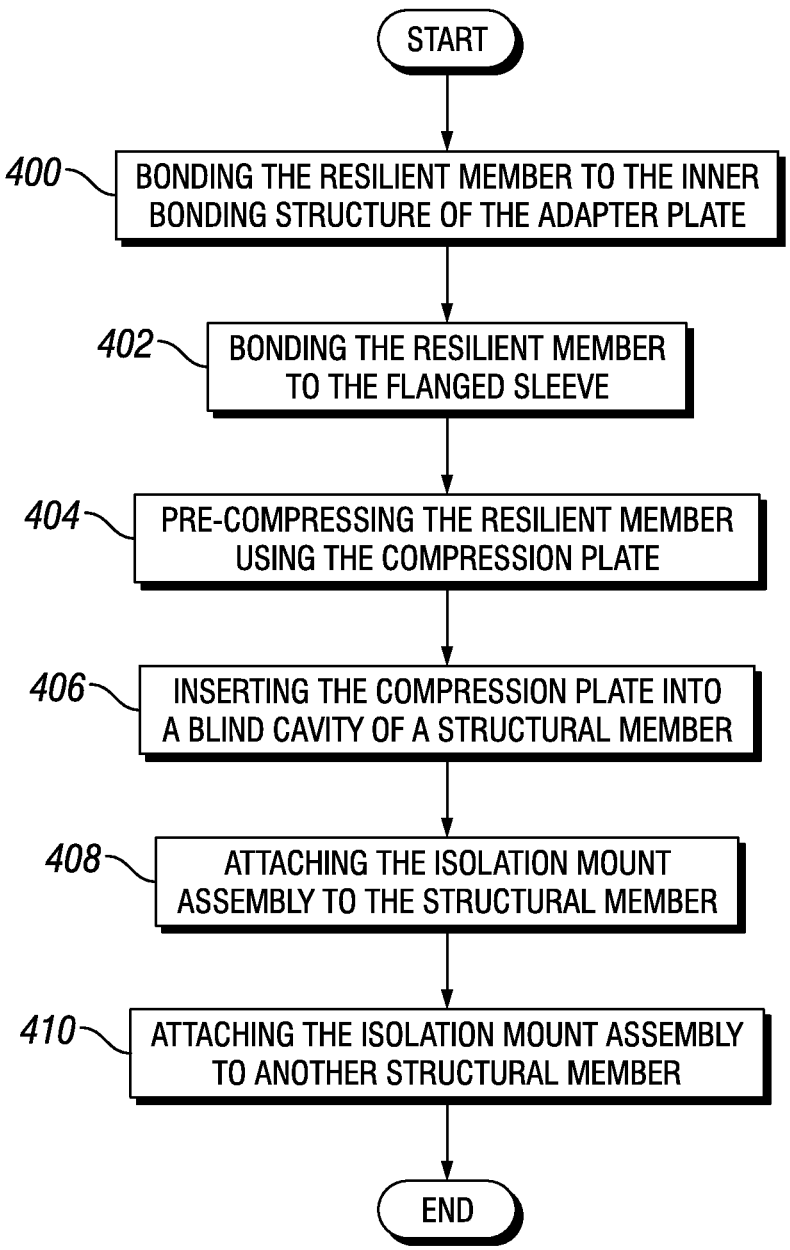
FIG. 9 is a flowchart depicting a method of assembling a machine using an isolation mount assembly according to various embodiments of the present disclosure.

The various embodiments of the apparatus described herein may be use with a method of manufacturing and assembly as shown in the flowchart of FIG. 9, that uses an isolation mount assembly with a resilient member, a compression plate, an adapter plate including outer mechanical attachment structure and inner bonding structure, and a flanged sleeve.

The method may comprise bonding the resilient member to the inner bonding structure of the adapter plate (see step 400). The method may further comprise bonding the resilient member to the flanged sleeve (see step 402). In some embodiments, the method may further comprise pre-compressing the resilient member using the compression plate (see step 404). Next, the method may include inserting the compression plate into a blind cavity of a structural member (see step 406). Then, attaching the isolation mount assembly to the structural member (see step 408). Finally, the method may include attaching the isolation mount assembly to another structural member (see step 410). In applications where a cab assembly and a frame assembly are provided, the isolation mount assembly may be placed into a cab mount cavity (blind pocket) and attached using four fasteners. The cab would then be lowered onto the frame where the isolation mount assembly would be bolted to the frame.

The method illustrated by FIG. 9 may be modified in a number of ways. For example, the flanged sleeve may not be bonded to the resilient member in some embodiments. Similarly, the resilient member may not be bonded to the adapter plate at all in other embodiments. For example, the resilient member may be made from BASF® CELLASTO® or another similar type of material that is simply inserted and mechanically held to the adapter plate. Accordingly, the inner attachment structure as described herein may in some cases include an inner bonding structure when adhesion or the like is used, but also includes embodiments when such methods are not used. Also, the isolation mount may be used in applications where a blind cavity is not present although the use of a compression plate and flanged sleeve allows the isolation mount to be used effectively with a blind cavity. Flats 298 (see FIG. 2) may be provided on the flange portion 222 of the sleeve 220 that engage a member defining a blind cavity to prevent the sleeve 222 from rotating when a first bolt 278, 280 is being mated with the internal threads 228 of the sleeve 220. These flats may be omitted in cases when the sleeve is bonded to the resilient member, thereby preventing this rotation.

It will be appreciated that the foregoing description provides examples of the disclosed assembly and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An isolation mount assembly comprising:
    a resilient member defining a central aperture that defines a load axis, the resilient member further defining an annular depression about the load axis; and
    an adapter plate including an outer mechanical attachment structure that defines a first thickness measured along the load axis and an inner attachment structure that is closer to the load axis than the outer attachment structure along a direction that is perpendicular to the load axis and that defines a second thickness measured along the load axis;
    wherein the inner attachment structure is disposed in the annular depression and the second thickness of the inner attachment structure is at least twice the thickness of the outer mechanical attachment structure, and wherein the inner attachment structure defines at least one recess that is configured to create an undercut in a direction that is perpendicular to the load axis.

2. The isolation mount assembly of claim 1 wherein the adapter plate is an assembly that includes at least two formed sheets that are attached to each other.

3. The isolation mount assembly of claim 2 wherein the inner attachment structure is at least partially hollow and the assembly further comprises a support tube that is disposed in the hollow portion of the inner attachment structure wherein the support tube is configured to attach the formed sheets together and support the assembly when loaded.

4. The isolation mount assembly of claim 1, wherein the inner attachment structure is an inner bonding structure that defines an inner bonding surface, a lower bonding surface, an upper bonding surface, and an outer bonding surface, wherein the recess is disposed on at least one of the upper and lower bonding surfaces.

5. The isolation mount assembly of claim 1, wherein the outer mechanical attachment structure defines at least one clearance hole.

6. The isolation mount assembly of claim 2 wherein the outer mechanical attachment structure includes at least one rivet structure that is configured to hold the formed sheets together.

7. The isolation mount assembly of claim 1 wherein the resilient member is substantially axis-symmetrical about the load axis.

8. The isolation mount assembly of claim 7, wherein the resilient member comprises at least one conical or cylindrical portion that defines an axis that is coincident with the load axis.

9. An isolation mount assembly comprising:
a resilient member defining a central aperture that defines a load axis, the resilient member including a first end and a second end that are spaced from each other along the load axis;
an adapter plate including inner attachment structure and outer mechanical attachment structure that is further away from the load axis than the inner attachment structure; and
a flanged sleeve including a flange that is configured to contact the first end of the resilient member and a shaft that defines a central bore that defines a longitudinal axis;
wherein the longitudinal axis of the sleeve is coincident with the load axis of the resilient member when the shaft of the flanged sleeve is disposed in the central aperture of the resilient member and the central bore of the shaft of the flanged sleeve includes internal threads.

10. The isolation mount assembly of claim 9 further comprising a compression plate that defines a mounting aperture wherein the compression plate is configured to contact the second end of the resilient member opposite the flanged sleeve along the load axis and the mounting aperture is configured to align with the central bore of the shaft of the flanged sleeve.

11. The isolation mount assembly of claim 10 wherein the compression plate defines a maximum dimension that is perpendicular to the load axis, the flange of the flanged sleeve defines a maximum dimension of the flanged sleeve that is perpendicular to the load axis, and the adapter plate defines a minimum dimension that is perpendicular to the load axis, wherein the maximum dimension of the compression plate or the flanged sleeve is less than or equal to the minimum dimension of the adapter plate.

12. The isolation mount assembly of claim 10 further comprising a first mounting fastener that is operatively associated with the compression plate, wherein the first mounting fastener includes external threads that are configured to mate with the internal threads of the bore of the shaft of the flanged sleeve.

13. The isolation mount assembly of claim 9, wherein the outer mechanical attachment structure of the adapter plate defines a plurality of clearance holes.

14. A machine comprising:
a first structural member;
a second structural member; and
an isolation mount assembly attached to the first and second structural members and disposed therebetween, the isolation mount assembly comprising:
  a resilient member defining a central aperture that defines a load axis, the resilient member including a first end and a second end that are diametrically opposite each other along the load axis;
  an adapter plate including inner attachment structure and outer attachment structure that is further away from the load axis than the inner attachment structure; and
  a flanged sleeve including a flange that is configured to contact the first end of the resilient member and a shaft that defines a central bore that defines a longitudinal axis;
  wherein the longitudinal axis of the sleeve is coincident with the load axis of the resilient member when the shaft of the flanged sleeve is disposed in the central aperture of the resilient member and the central bore of the shaft of the flanged sleeve includes internal threads.

15. The machine of claim 14 further comprising a cab assembly that includes the first structural member and a frame assembly that includes the second structural member.

16. The machine of claim 15 further comprising a compression plate that defines a mounting aperture wherein the compression plate is configured to contact the second end of the resilient member opposite the flanged sleeve along the load axis and the mounting aperture is configured to align with the central bore of the shaft of the flanged sleeve, and wherein the first or second structural members define a blind pocket in which the compression plate is disposed.

17. The machine of claim 16 further comprising first and second mounting fasteners wherein the first mounting fastener is operatively associated with the compression plate and the second mounting fastener is operatively associated with the first or second structural members.

18. The machine of claim 14 further comprising outer mechanical attachment structure that defines a first surface area and an inner attachment structure that defines a second surface area wherein the first surface area is less than the second surface area.

* * * * *